(12) United States Patent
Torno et al.

(10) Patent No.: US 6,267,100 B1
(45) Date of Patent: Jul. 31, 2001

(54) DEVICE FOR SUPPRESSING ENGINE KNOCKING IN INTERNAL COMBUSTION ENGINES

(75) Inventors: Oskar Torno, Schwieberdingen; Carsten Kluth, Stuttgart; Werner Haeming, Neudenau, all of (DE); Steffen Franke, Harrow (GB); Michael Baeuerle, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/445,173

(22) PCT Filed: Mar. 31, 1999

(86) PCT No.: PCT/DE99/00982
§ 371 Date: Mar. 13, 2000
§ 102(e) Date: Mar. 13, 2000

(87) PCT Pub. No.: WO99/51875
PCT Pub. Date: Oct. 14, 1999

(30) Foreign Application Priority Data

Apr. 3, 1998 (DE) .............................. 198 14 938

(51) Int. Cl.⁷ .............................. F02P 5/152; F02P 5/14; F02D 35/02; F02D 41/14
(52) U.S. Cl. .................... 123/406.29; 73/35.01; 123/406.55; 701/111
(58) Field of Search .................. 123/406.29, 406.34, 123/406.35, 406.36, 406.55; 73/35.01, 35.03–35.06; 701/111

(56) References Cited

U.S. PATENT DOCUMENTS

| 4,265,206 |   | 5/1981 | Giampaolo ..................... 123/406.29 |
| 4,586,474 |   | 5/1986 | Masahira ........................ 123/406.33 |
| 4,763,625 | * | 8/1988 | Staerzl et al. ........................ 123/435 |
| 5,150,682 |   | 9/1992 | Jean-Louis .......................... 123/25 J |
| 5,235,952 | * | 8/1993 | Takasuka et al. ................. 123/406.3 |
| 5,373,448 |   | 12/1994 | Kozo et al. ........................... 701/111 |

FOREIGN PATENT DOCUMENTS

02 211 381  8/1990 (JP) .

* cited by examiner

*Primary Examiner*—Tony M. Argenbright
(74) *Attorney, Agent, or Firm*—Kenyon & Kenyon

(57) ABSTRACT

A device for suppressing knocks in internal combustion engines, in which the ignition firing point is adjusted after knocking has occurred, and this knock control is only activated in response to specifiable thermal conditions in the internal combustion engine. The gas-inlet temperature in the combustion chamber of the internal combustion engine is ascertained for the valuation of the thermal conditions of the internal combustion engine and for switching the knock control into the active state.

4 Claims, 2 Drawing Sheets

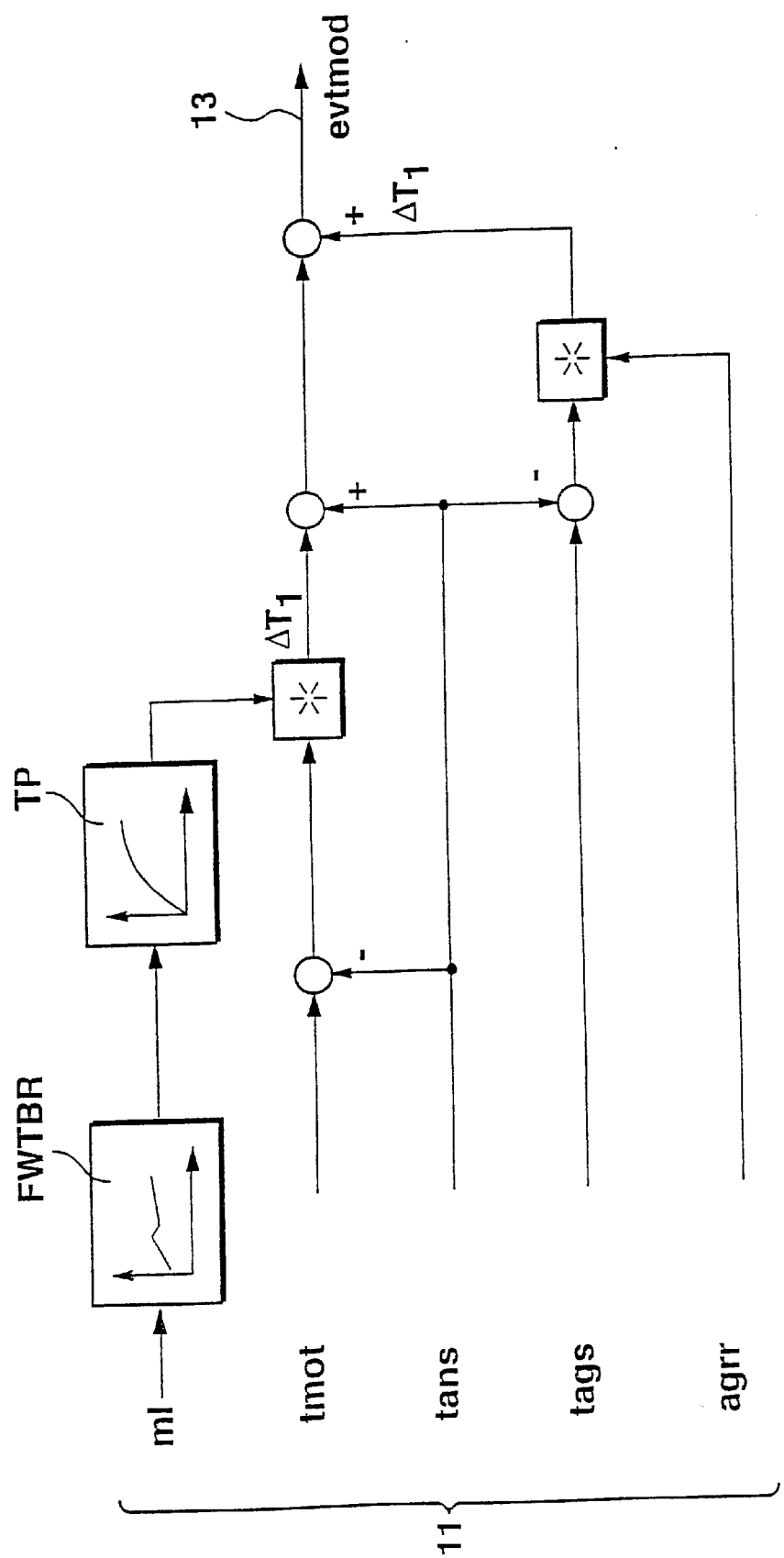

DEVICE FOR SUPPRESSING ENGINE KNOCKING IN INTERNAL COMBUSTION ENGINES

BACKGROUND INFORMATION

German Patent No. 3 420 465 describes a device for suppressing engine knocks. In this known device, the operating parameters of the internal combustion engine are ascertained, and the respective manipulated variables for the processes to be controlled, such as ignition and injection, are determined in a control unit on the basis of these acquired operating parameters. Thus, for example, the optimal ignition firing point is calculated on the basis of speed and acting load. In the known device, provision is also made for a knock detector which determines the combustion noises individually for each cylinder. The signals from the knock detector are forwarded to a knock-signal evaluation circuit, and after filtering out the background noises, are compared there to a reference level. If a knocking combustion has been detected, then to suppress knocking, the ignition firing point in this cylinder, determined on the basis of speed and load, is retarded, thus is adjusted away from the knock limit. After a specifiable number of knock-free combustions, this altered ignition firing point is again brought forward step-wise to the manipulated variable determined by the control unit. Since there is no danger of knocking combustions when the engine is cold, it is customary to switch the knock control to the active state only after reaching a specifiable engine temperature, thus after the warm-up of the internal combustion engine. Below this enabling temperature, it is certain that no knocking can occur, since the thermal conditions in the combustion chamber do not allow it. In the known systems, the engine coolant temperature is determined for ascertaining the engine temperature.

SUMMARY OF THE INVENTION

Compared to the known device, the device of the present invention in which the knock control is enabled as a function of the gas inlet temperature into the combustion chamber—has the advantage that precise information about the actual thermal conditions in the combustion chamber can prevent the knock control from being switched on too early, thus avoiding unnecessary or incorrect interventions of the knock control, which in turn results in improved efficiency.

It is advantageously possible to simulate the inlet temperature from a number of measured quantities such as of the engine temperature and the intake-air temperature, from the exhaust-gas recirculation temperature, the air-mass flow and the exhaust-gas recirculation rate. No additional sensors are necessary in doing this, since these temperatures are already determined anyway in the case of modern control devices, making this design approach particularly cost-effective.

A second possibility is also to make provision directly at the intake valve for a temperature sensor which, for example, can be structurally joined to the intake valve. This presents the possibility of the control device needing no additional computing capacity.

In general, the direct acquisition of the gas-inlet temperature, or determining the gas-inlet temperature with the aid of a model, makes it possible to rule out disturbance noises because of the motor oil which is still cold, and thus to rule out falsely detected knocking. Thus, the retard of the ignition-advance angle is not unjustifiably activated, which in turn means an increase in traveling comfort and efficiency.

BRIEF DESCRIPTION OF THE DRAWING

FIG. 2 shows a block diagram for determining the gas inlet temperature without a temperature sensor in the combustion chamber.

DETAILED DESCRIPTION

Figure 1:
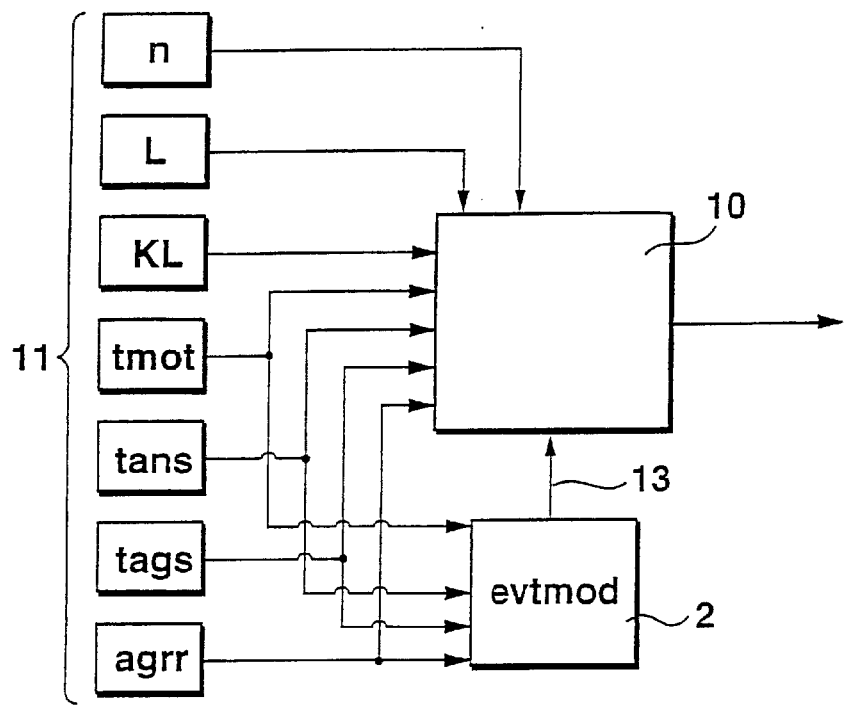
FIG. 1 shows a basic block diagram for the device of the present invention.

FIG. 1 shows a block diagram of the device for carrying out the method. A number of input signals 11, which characterize the operating conditions of the internal combustion engine and which are acquired by sensors (not shown), are supplied to a control unit 10. On the basis of speed signal n and load signal L, control unit 10 determines the ignition firing point which, as already explained in the introductory description, is taken from a characteristic map that spans load and speed. Signal KL from the knock sensor is also fed to control unit 10 which, if the knock control is active, retards the ignition firing point after knocking has occurred. The knock control itself is already related art and is acknowledged as such in the introductory description, which is why it shall not be discussed in detail here again.

The engine temperature tmot (which generally represents the temperature of the coolant), the intake-air temperature tans, the exhaust-gas recirculation temperature tags and the exhaust-gas recirculation rate agrr are determined in the internal combustion engine for various further processes to be controlled. In previously known control units for controlling the ignition of an internal combustion engine, the knock control is switched to the active state as a function of engine temperature tmot as soon as it has reached a specifiable threshold, the coolant temperature being ascertained as the engine temperature. In modern control devices, just as in the case of the subject matter of the present invention, air mass ml, intake-air temperature tans, exhaust-gas recirculation temperature tags and exhaust-gas recirculation rate agrr are determined in addition to engine temperature tmot, and are evaluated for controlling various processes. These temperatures are now also supplied to a work step 12 for calculating the gas-inlet temperature. In work step 12, the gas-inlet temperature, designated in the following by evtmod (Einlaßventil Temperatur modelliert [modeled intake-valve temperature]), is simulated on the basis of a model from the acquired quantities. The gas-inlet temperature represents the temperature of the combustion-chamber air mixture at the intake valve into the combustion chamber.

In the following, the model for determining gas-inlet temperature evtmod from the acquired quantities including air mass ml, engine temperature tmot, intake-air temperature tans, exhaust-gas recirculation temperature tags and exhaust-gas recirculation rate agrr shall be clarified with reference to FIG. 2.

The interrelation between the individual acquired data is shown in the model in FIG. 2, these interrelations resulting on the basis of the thermodynamic regularities. Intake-air temperature tans is the temperature of the air drawn in. This intake air is influenced in the induction pipe by engine temperature tmot prevailing there. Intak-eair quantity ml must be taken into account at the same time. Thus, for example, a small mass of intake air will be heated to a substantially greater extent by the hotter engine temperature tmot than a large mass of intake air. The air-mass quantity is considered in the indicated model using a weighting factor FWTBR, this factor FWTBR being a characteristic able to be plotted as a curve over the air-mass flow. This factor FWTBR is ascertained on the engine test stand, in that the temperature at the intake valve, detected by a sensor, and the intake-air temperature are determined as a function of the various possible air-mass flows, and are set in relation to each other. In order to be able to correctly weight the air-mass flow in a dynamic situation as well, after the weighting operation by the factor FWTBR, the quantity for the intake air mass is fed via a first-order low-pass filter TP. In so doing, it is taken into consideration that, given a change from one to another working point having a different air-flow rate, a certain time passes until a temperature equilibrium has set in again. The temperature increase $\Delta T1$, resulting due to the heat entry on the part of the engine temperature, is proportional to the heat entry itself, so that: $\Delta T1 = FWTBR*(tmot-tans)$.

The mixture of the intake air with the recirculated hotter exhaust gas yields a further temperature increase, this second heat entry $\Delta T2$ resulting from the exhaust-gas recirculation rate agrr, which is defined based on the relative exhaust-gas mass, and the exhaust-gas temperature tags:

$$\Delta T2 = agrr*(tags-tans).$$

If one now assumes that both thermal capacities $\Delta T1$ and $\Delta T2$ enter equally into the equation, then the modeled temperature evmod at the injection valve is expressed as:

$$evmod = FWTBR*(tmot-tans) + agrr*(tags-tans).$$

Figure 3:
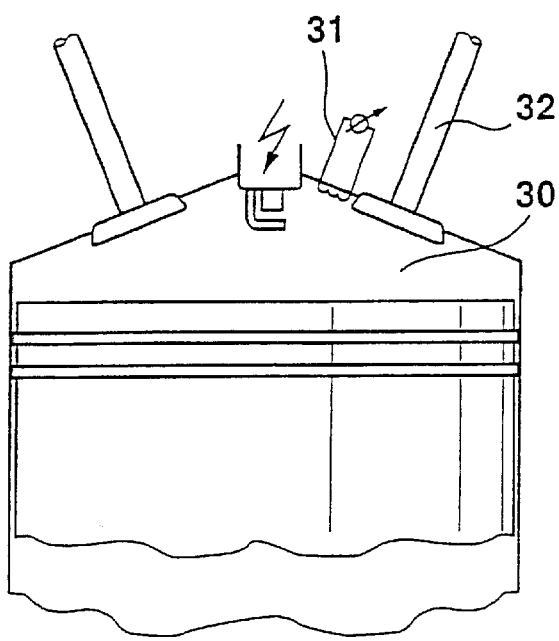
FIG. 3 shows a possible arrangement of a temperature sensor in the combustion chamber.

Naturally, as is shown schematically in FIG. 3, it is also possible to directly detect the gas-inlet temperature in combustion chamber 30 using a temperature sensor 31 which is arranged in the immediate vicinity of an intake valve 32, or is possibly even structurally integrated in the intake valve.

What is claimed is:

1. A device for suppressing knocks in an internal combustion engine, comprising:

means for ascertaining at least one operating parameter;
a control unit for determining at least one manipulated variable for an injection and an ignition based on the at least one operating parameter;
means for ascertaining a gas-inlet temperature in a combustion chamber for determining a presence of particular thermal conditions of the internal combustion engine;
at least one knock sensor for detecting a knocking; and
a device for correcting the at least one manipulated variable for the ignition such that, in response to the detected knocking, the at least one manipulated variable for the ignition is adjusted away from a knock limit to suppress the knocking and, after a preselected number of knock-free combustions, the at least one manipulated variable for the ignition is subsequently adjusted forward again stepwise to the at least one manipulated variable as determined by the control unit, the knocking suppression only being switched into an active state in response to the presence of the particular thermal conditions of the internal combustion engine.

2. The device according to claim 1, wherein the means for ascertaining the gas-inlet temperature includes a temperature sensor in the combustion chamber proximate to an intake valve.

3. The device according to claim 1, wherein the gas-inlet temperature is ascertained as a function of a thermodynamic model calculation based on an engine temperature, an intake-air temperature and an air-mass flow.

4. The device according to claim 3, wherein the thermodynamic model calculation is also based on an exhaust-gas temperature and an exhaust-gas recirculation rate.

* * * * *